UNITED STATES PATENT OFFICE 2,593,308

TREATING LIQUID EGG MATERIAL

Lloyd B. Jensen, Chicago, and Walter R. Hess, Downers Grove, Ill., assignors, by mesne assignments, to Swift & Company, a corporation of Illinois No Drawing. Application June 16, 1948, Serial No. 33,433

2 Claims. (Cl. 99—196)

The present invention relates to the preservation of foodstuffs and more particularly to the preservation of eggs and egg material by controlling the temperature of storage.

It is an object of the invention to maintain whole eggs, egg yolks, egg whites, or mixtures thereof, in an edible condition for longer periods of time than has been possible in the past.

Another object of the invention is to accomplish this result more economically than has been done by prior methods.

Still another object of the invention is to reduce the bacterial count of egg material.

A still further object of the invention is to prepare an improved egg product.

It has been generally believed in the past that the lower the temperature at which foodstuffs are stored the greater the lethal effect upon the bacteria associated therewith. It has been discovered, however, that the actual facts are quite contrary to this belief and that there are critical temperatures below freezing for the destruction of bacteria. For egg material these temperatures are below about 20° F. and 25° F. for maximum bactericidal effect. Tests have shown that even at extremely low temperatures, in fact as low as —110.2° F., bacteria have remained viable after months of storage. When egg material is held in storage at the critical temperatures specified above, however, there was found to be an unexpectedly marked decrease in the bacteria found in the egg material.

In accordance with the well-known quick freezing process, the egg material being treated is rapidly frozen by maintaining it in good heat exchange relationship with fluids having temperatures below 0° F., for example ranging from —0° F. to —35° F. or even lower. After freezing, it has been customary to place the food in storage at quite low temperatures, usually ranging from 0° F. downward. According to the present invention, however, the egg material to be preserved is, after the quick-freeze operation, placed in storage at the considerably higher temperatures, such as about 20° F. to 25° F., specified above, and in this way the number of viable microbial cells are materially reduced.

The following example, consisting of an experiment performed upon eggs, will serve to illustrate the invention.

Whole fresh eggs were broken out, emulsified and then inoculated with pure cultures of Pseudomonas, Achromobacter, and *Escherichia coli* of avian origin. The several inoculated portions of mixed liquid eggs (i. e., yolks—whites) were placed in 8″ x 1″ culture tubes and frozen at —22° F. After 4 to 5 hours the magma was hard frozen. Half the tubes was placed at 24° F. and the remainder held at —22° F. One tube of each type of inoculated mixed eggs was examined just before freezing and immediately after freezing. The following table shows the averaged results of many tests:

| Bacteria Common Egg Flora | Before Freezing Per gram | After Freezing —22° F. per gram | Storage 1 month Bacteria per gram | |
|---|---|---|---|---|
| | | | —22° F. | +24° F. |
| *Esch. coli* | 6,500,000 | 6,300,000 | 6,200,000 | 109,000 |
| Pseudomonas | 11,500,000 | 11,000,000 | 12,000,000 | 450,000 |
| Achromobacter | 35,000,000 | 36,000,000 | 33,000,000 | 2,700,000 |
| Achromobacter | 4,000,000 | 4,200,000 | 4,000,000 | 136,000 |
| *Esch. coli* #1 | | 220,000 | 270,000 | 15,000 |
| *Esch. coli* #2 | | 223,000 | 156,000 | 5,000 |
| Pseudomonas #1 | | 1,000,000 | 2,500,000 | 110,000 |
| Pseudomonas #2 | | 9,000,000 | 5,000,000 | 380,000 |
| Achromobacter #1 | | 143,000 | 300,000 | 4,000 |
| Achromobacter #2 | | 630,000 | 800,000 | 45,000 |

It is evident on examining the foregoing data that after storing the mixed liquid eggs for one month at +24° F. there is a very substantial and unexpectedly large decrease in the number of bacteria per gram in the eggs. Thus, for example, B. pseudomonas, which is one of the principal bacteria found naturally in shell eggs and frozen egg material, is reduced in number from about 11,000,000 per gram to about 450,000 per gram after storage at +24° F., whereas there is no apparent decrease in the said bacteria count in the eggs when stored at a temperature of about —22° F. Tests similar to the foregoing made on various egg material have also demonstrated that holding temperatures between approximately 20° F. and 25° F. have the maximum bactericidal effect upon the common contaminating forms of bacteria in the egg material.

It is readily apparent that the present invention, aside from the fact that a better preserving is accomplished, will result in a considerably more economical storage of the egg material because of the less costly equipment and lower consumption of energy which will be required in maintaining the storage temperature.

The term "egg material" as used in the description and in the claims which follow should be understood to mean material containing substantial amounts of whole eggs, egg yolks, egg whites, or mixtures thereof.

Obviously, many modifications and variations of the invention hereinbefore set forth may be made without distinguishing from the spirit and scope thereof, and therefore only such limitations should be imposed as are indicated in the appended claims.

We claim:

1. In a process of treating liquid egg materials to prolong the storage life thereof by substantially reducing the bacteria count wherein the liquid egg material is frozen and held in the frozen condition until used, the steps comprising thoroughly mixing the liquid egg materials, holding said thoroughly mixed egg materials at a temperature below about 0° F. to rapidly freeze said egg materials, and storing said frozen egg materials at a temperature of about 24° F.

2. In a process of treating mixed liquid egg material to prolong the storage life thereof by substantially reducing the bacteria count wherein the liquid egg material is frozen and held in the frozen condition until used, the steps comprising subjecting the liquid egg material to a quick freezing operation by holding it at a temperature below about 0° F. until frozen, and storing said frozen egg material at a temperature ranging between 20° F. and 25° F.

LLOYD B. JENSEN.
WALTER R. HESS.

REFERENCES CITED

The following references are of record in the file of this patent:

UNITED STATES PATENTS

| Number | Name | Date |
| --- | --- | --- |
| 1,398,860 | Hussey | Nov. 29, 1921 |
| 1,759,682 | Birdseye | May 20, 1930 |
| 1,992,263 | Vahlteich | Feb. 26, 1935 |

FOREIGN PATENTS

| Number | Country | Date |
| --- | --- | --- |
| 429,008 | Great Britain | May 22, 1935 |

OTHER REFERENCES

"Food Industries," May 1943, pages 67 and 68, article entitled, "How To Produce Frozen Eggs That The Housewife Can Use."

"The Freezing Preservation of Foods," 1943, by D. K. Tressler, published by The Avi Publishing Company, Inc., page 540.